United States Patent
Pae et al.

(10) Patent No.: US 11,851,527 B2
(45) Date of Patent: Dec. 26, 2023

(54) POLYAMIDE-10 HAVING SUPERIOR MECHANICAL AND THERMAL PROPERTIES AND METHOD FOR PREPARATION THEREOF

(71) Applicant: SK CHEMICALS CO. LTD., Gyeonggi-do (KR)

(72) Inventors: Chong Kwon Pae, Gyeonggi-do (KR); Min Soo Kim, Gyeonggi-do (KR); Soo-Hyun Kim, Incheon (KR); Jae Kyun Park, Seoul (KR); Jeong Ho Park, Gyeonggi-do (KR); Jong-In Lee, Gyeonggi-do (KR); Chang-yeol Lee, Busan (KR); Jae-Il Chung, Gyeonggi-do (KR); Hyun Jun Cho, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 282 days.

(21) Appl. No.: 17/311,775

(22) PCT Filed: Nov. 27, 2019

(86) PCT No.: PCT/KR2019/016484
§ 371 (c)(1),
(2) Date: Jun. 8, 2021

(87) PCT Pub. No.: WO2020/122470
PCT Pub. Date: Jun. 8, 2021

(65) Prior Publication Data
US 2022/0025116 A1    Jan. 27, 2022

(30) Foreign Application Priority Data

Dec. 10, 2018 (KR) .................. 10-2018-0158629

(51) Int. Cl.
*C08G 69/10* (2006.01)
*C08G 69/06* (2006.01)

(52) U.S. Cl.
CPC ............. *C08G 69/10* (2013.01); *C08G 69/06* (2013.01)

(58) Field of Classification Search
None
See application file for complete search history.

(56) References Cited

U.S. PATENT DOCUMENTS

| 2,674,607 A | 4/1954 | Genas |
| 2,839,548 A | 6/1958 | Berther et al. |
| 2,956,066 A | 10/1960 | Minisci |
| 5,541,267 A | 7/1996 | Akkapeddi et al. |
| 6,143,862 A | 11/2000 | Blondel et al. |
| 6,160,080 A | 12/2000 | Cucinella et al. |
| 6,525,166 B1 | 2/2003 | Di Silvestro et al. |
| 2018/0155497 A1 | 6/2018 | Quinn et al. |

FOREIGN PATENT DOCUMENTS

| CA | 2177240 A1 * | 11/1996 |
| DE | 60215971 | 5/2007 |
| GB | 689393 | 3/1953 |
| JP | S63-286428 | 11/1988 |
| JP | H09-502478 | 3/1997 |
| JP | H11-166048 | 6/1999 |
| JP | 2005-513184 | 5/2005 |
| KR | 10-1999-0066966 | 8/1999 |
| KR | 10-0427830 | 4/2004 |
| WO | WO 95/14059 | 5/1995 |
| WO | WO 2010/102271 A3 * | 9/2010 |
| WO | WO 2010/134682 | 11/2010 |

OTHER PUBLICATIONS

Extended Search Report for European Patent Application No. 19897328.1, dated Jun. 27, 2022, 8 pages.
Coffman et al. "Polymeric Amides from Omega-Amino Acids," Journal of Polymer Science, 1948, vol. 3, No. 1, pp. 85-95.
Cojazzi et al. "The Crystal Structure of Polycapryllactam (Nylon 8) and Polycapriclactam (Nylon10)," Makromolekulare Chemie, 1978, vol. 179, pp. 509-518.
Cojazzi et al. "A New Crystalline Modification of Nylon 10," European Polymer Journal, 1985, vol. 21, No. 3, pp. 309-315.
Dachs et al. "Pyrrolidone, Capryllactam and Laurolactam as new Monomers for Polyamide Fibers," Angewandte Chemi International Edition, 1962, vol. 1, No. 8, pp. 430-435.
Horn et al. "Nylon 7, ein faserbildendes Polyamid," Angewandte Chemie, 1962, vol. 15, pp. 531-534.
Kinoshita "An Investigation of the Structures of Polyamide Series," Makromolekulare Chemi, 1959, vol. 33, pp. 1-20.
International Search Report and Written Opinion for International (PCT) Patent Application No. PCT/KR2019/016484, dated Mar. 18, 2020, 8 pages.
English Translation of the International Search Report for International (PCT) Patent Application No. PCT/KR2019/016484, dated Mar. 18, 2020, 3 pages.

* cited by examiner

*Primary Examiner* — Tae H Yoon
(74) *Attorney, Agent, or Firm* — Sheridan Ross P.C.

(57) ABSTRACT

This invention relates to polyamide-10 and a method for preparing the same, and according to this invention, polyamide-10 having superior mechanical and thermal properties can be prepared by preparing polyamide-10 while controlling the condensation polymerization conditions of 10-aminodecanoic acid.

13 Claims, No Drawings

POLYAMIDE-10 HAVING SUPERIOR MECHANICAL AND THERMAL PROPERTIES AND METHOD FOR PREPARATION THEREOF

CROSS-REFERENCE TO RELATED APPLICATION

This application is a national stage application under 35 U.S.C. 371 and claims the benefit of PCT Application No. PCT/KR2019/016484 having an international filing date of 27 Nov. 2019, which designated the United States, which PCT application claims the benefit of Korean Patent Application No. 10-2018-0158629 filed on 10 Dec. 2018 with the Korean Intellectual Property Office, the disclosures of each of which are incorporated herein by reference in their entireties.

TECHNICAL FIELD

This invention relates to polyamide-10 having superior mechanical and thermal properties, and a method for preparation thereof.

BACKGROUND ART

Polyamide is a representative thermoplastic, and generally refers to polymer compounds having amide bonds. Due to hydrogen bond property between molecules resulting from the hydrogen atom and oxygen atom of the amide bond, it has superior strength, abrasion resistance, chemical resistance, and electric insulation property, and thus, is being used to manufacture synthetic fiber or machine parts, electrical components, and the like.

Among polyamides of various structures, long chain polyamide (LCPA) generally refers to polyamides 610, 612, 1010, 1012, 11, 12, and the like, having a carbon number of 7 or more per an amide bond in the repeat unit, and since it simultaneously exhibits the properties of polyamide and polyolefin plastic, it is known to have moisture resistance, low density (light weight), block resistance, easy processability, in addition to the properties of polyamide. Particularly, since it has superior moisture resistance, chemical resistance, fuel resistance compared to common polyamides represented by PA6 and PA66, it is being used as optimal material in applications of automobile fuel line, oil field/natural gas industrial tube, pipe, and the like.

Meanwhile, although basic properties (mainly, thermal property) of polyamide-10 (PA10) have been known for a long time through many papers, and a synthesis method of the monomer 10-aminodecanoic acid (10-ADA) has been suggested through several patents, any commercially significant preparation method of 10-ADA is not known, and thus, preparation methods and various properties of PA10 are hardly known. Thus, the properties of PA10 compared to those of commercial products polyamide-11 (PA11) or polyamide-12 (PA12) are not known, and the usefulness of PA10 has not been concretely examined up to date.

Meanwhile, polyamide is prepared by condensation polymerization of monomers, and the properties and characteristics of polyamide may be influenced by condensation polymerization conditions. Thus, the inventors confirmed polyamide-10 having equivalent or superior properties to currently widely used polyamide-11 (PA11) or polyamide-12 (PA12), and condensation polymerization conditions for the preparation thereof, and completed the invention.

DISCLOSURE

Technical Problem

It is an object of the invention to provide polyamide-10 having superior mechanical and thermal properties.

It is another object of the invention to provide a method for preparing polyamide-10.

Technical Solution

In order to solve the problems, there is provided polyamide-10 wherein number average molecular weight (g/mol) is 5000 to 25000, tensile strength (MPa) and tensile modulus (MPa), measured according to ISO 527-2, are 40 to 70, and 800 to 1400, respectively, and flexural strength (MPa) and flexural modulus (MPa), measured according to ISO 178, are 50 to 90, and 1200 to 1900, respectively.

As used herein, the term 'polyamide-10' means a polymer polymerized using 10-aminodecanoic acid (10-ADA) or decalactam (10-Lactam) as monomers. 10-aminodecanoic acid has a carboxyl group and an amine group at each end in the chemical structure, and thus, polyamide-10 can be prepared through condensation polymerization of 10-aminodecanoic acid, and polyamide-10 can be prepared by the ring-opening reaction of decalactam by water, followed by condensation polymerization.

Further, the properties of prepared polyamide-10 are influenced by condensation polymerization conditions, and in the present disclosure, by using condensation polymerization conditions as described below, polyamide-10 having superior mechanical and thermal properties can be prepared.

Preferably, the number average molecular weight of the polyamide-10 is 6000 or more, 7000 or more, 8000 or more, 9000 or more, or 10000 or more; and 24000 or less, 23000 or less, 22000 or less, 21000 or less, or 20000 or less.

Further, the polyamide-10 according to the invention has superior mechanical properties, and such properties are evaluated by tensile strength, tensile modulus, flexural strength, flexural modulus, Charpy notched impact strength, and Rockwell hardness, and the like.

The tensile strength and tensile modulus of the polyamide-10 are measured according to ISO 527-2. The tensile strength (MPa) of the polylamide-10 is 45 or more, or 50 or more; and 65 or less, or 60 or less. Further, preferably, the tensile modulus (MPa) of the polyamide-10 is 900 or more, or 1000 or more; and 1300 or less, or 1200 or less.

The flexural strength and flexural modulus of the polyamide-10 are measured according to ISO 178. Preferably, the flexural strength (MPa) of the polyamide-10 is 55 or more, or 60 or more; and 85 or less, or 80 or less. Further, preferably, the flexural modulus (MPa) of the polyamide-10 is 1250 or more, or 1300 or more; and 1850 or less, or 1800 or less.

The Charpy notched impact strength of the polyamide-10 is measured according to ISO 179.

Preferably, the Charpy notched impact strength (KJ/cm$^2$) of the polyamide-10 is 4 to 10 under room temperature condition (23° C.). More preferably, the Charpy notched impact strength (KJ/cm$^2$) of the polyamide-10 is 5 or more, or 6 or more; and 9 or less, or 8 or less under room temperature condition (23° C.).

Preferably, the Charpy notched impact strength (KJ/cm$^2$) of the polyamide-10 is 4 to 10 under low temperature condition (−30° C.). More preferably, the Charpy notched impact strength (KJ/cm$^2$) of the polyamide-10 is 5 or more, or 6 or more; and 9 or less, or 8 or less under low temperature condition (−30° C.).

The Rockwell hardness of the polyamide-10 is measured according to ISO 2039. Preferably, the Rockwell hardness of the polyamide-10 is 90 or more. More preferably, the Rockwell hardness of the polyamide-10 is 95 or more, or 100 or more. Meanwhile, as the Rockwell hardness value is higher, it is more excellent, and thus, there is no theoretical limitation in the upper limit, but for example, the Rockwell hardness may be 120 or less, 115 or less, or 110 or less.

Besides the above explained properties, the polyamide-10 according to the present disclosure has superior tensile elongation, tensile strength, and elongation at break.

The tensile elongation of the polyamide-10 is measured according to ISO 527-2. Preferably, the tensile elongation of the polyamide-10 is 4 to 10%. More preferably, the tensile elongation of the polyamide-10 is 5% or more, or 6% or more; and 9% or less, or 8% or less.

The tensile strength and elongation at break of the polyamide-10 are measured according to ISO 527-2.

Preferably, the tensile strength (MPa) at break of the polyamide-10 is 40 to 70. More preferably, the tensile strength (MPa) at break of the polyamide-10 is 45 or more, or 50 or more; and 65 or less, or 60 or less.

Preferably, the elongation at break of the polyamide-10 is 200% or more, more preferably, 250% or more, or 300% or more. Further, the elongation at break may be 700% or less, 600% or less, or 500% or less.

Further, the polyamide-10 according to this invention has superior thermal properties, and such properties are evaluated by heat deflection temperature.

The heat deflection temperature of the polyamide-10 is measured according to ISO 75. Preferably, the heat deflection temperature of the polyamide-10 is 100° C. or more, 105° C. or more, or 110° C. or more, under 0.45 MPa condition. Further, the heat deflection temperature of the polyamide-10 is 130° C. or less, 125° C. or less, 120° C. or less, or 115° C. or less, under 0.45 MPa condition. Preferably, the heat deflection temperature of the polyamide-10 is 40° C. or more, 45° C. or more, or 50° C. or more under 1.85 MPa condition. Further, the heat deflection temperature of the polyamide-10 is 120° C. or less, 115° C. or less, 110° C. or less, under 1.85 MPa condition.

The above explained properties of the polyamide-10 according to the present disclosure mean that it has equivalent or superior properties compared to the previously used polyamide-11 or polyamide-12, and thus, it can replace previously used polyamides.

There is also provided a method for preparing the above explained polyamide-10, comprising the following steps:
  adding 10-aminodecanoic acid in a reactor (step 1);
  raising the temperature of the reactor to 230 to 250° C., and then, maintaining the temperature while stirring 10-aminodecanoic acid (step 2);
  reducing the pressure in the reactor to 10 torr or less (step 3);
  subjecting the 10-aminodecanoic acid to a condensation polymerization reaction, and then, raising the pressure in the reactor to normal pressure (step 4); and
  recovering a product from the reactor (step 5).

Hereinafter, this invention will be explained in detail according to each step.

The step 1 is a step wherein 10-aminodecanoic acid is introduced into a reactor to prepare condensation polymerization.

Since a condensation polymerization reaction is progressed in the reactor, it is preferable to remove materials that may be involved in the reaction except reactants, particularly oxygen, and the like. In this regard, it is preferable to fill the inside of the reactor with inert gas so that condensation polymerization may be conducted under inert gas. As the example of the inert gas, nitrogen may be used. Further, the filling with inert gas may be conducted before, during or after introducing 10-aminomdecanoic acid into the reactor. Further, the inert gas may be filled after reducing the pressure inside of the reactor.

The step 2 is a step wherein the temperature of the reactor is raised to 230 to 250° C., thereby controlling the temperature at which 10-aminodecanoic acid may be molten and a condensation polymerization reaction may occur.

The temperature is not limited as long as condensation polymerization of 10-aminodecanoic acid may occur, but outside the above range, namely, at a temperature less than 230° C., condensation polymerization does not sufficiently occur, and thus, a reaction for a long time is required and productivity is significantly lowered, and at a temperature higher than 250° C., due to rapid condensation polymerization, problems are generated in terms of molecular weight control and recovery after the reaction.

Further, during the process of raising to the above temperature, 10-aminodecanoic acid in the reactor may be stirred. Namely, as the temperature in the reactor rises, 10-aminodecanoic acid is molten and becomes liquid, and thus, it is preferable to stir 10-aminodecanoic acid so that condensation polymerization may sufficiently occur. Further, as the temperature increases, the viscosity of 10-aminodecanoic acid gradually decreases, and thus, it is preferable to increase the stirring speed as the temperature increases. Further, the stirring may be conducted until the pressure is raised to a normal pressure in the step 4 described below.

Meanwhile, it is preferable that the steps 1 and 2 are conducted under normal pressure. Throughout the specification, the 'normal pressure' means common atmospheric pressure, and specifically, it means a pressure in the range of 760±10 torr.

Further, in order to prevent contact of 10-aminodecanoic acid in the reactor with air, particularly oxygen, and oxidation in the steps 1 and 2, it is preferable that inert gas is continuously introduced and discharged. Thereby, water vapor, a by-product generated during the reaction, is discharged and the reaction is smoothly progressed. As the inert gas, nitrogen is preferably used.

Preferably, after the temperature rise is completed in the step 2, it is preferable that the temperature is maintained for 1 hour to 4 hours. Further, it is preferable that 10-aminodecanoic acid is stirred while the temperature is maintained.

The step 3 is a step wherein the pressure inside of the reactor is reduced to 10 torr or less, thus progressing a condensation polymerization reaction of 10-aminodecanoic acid. Thereby, water vapor, a by-product during the condensation polymerization reaction, is removed to achieve the aimed molecular weight of polyamide-10, and bubble existing in the polymer is removed to obtain uniform polymer.

Wherein, it is preferable that the pressure is gradually reduced from a normal pressure to 10 torr or less.

Preferably, the step 3 may be progressed in plural stages, for example, 2 to 10 stages, 3 to 9 stages, or 4 to 8 stages, and in each pressure reduction stage, the pressure may be sequentially reduced by 50 to 200 torr. Further, each pressure reduction stage may be sequentially progressed at an interval of 2 to 10 minutes, 3 to 9 minutes, or 4 to 8 minutes, considering the efficiency of the process, and the properties of polyamide-10.

Although not theoretically limited, by conducting step-by-step pressure reduction as explained above, the condensation polymerization of 10-aminodecanoic acid may be effectively progressed, thereby improving the mechanical and thermal properties of the finally prepared polyamide-10.

Further, preferably, in the step 3, the pressure inside the reactor is finally reduced to 90 torr or less, 80 torr or less, 70 torr or less, 60 torr or less, 50 torr or less, 40 torr or less, 30 torr or less, 20 torr or less, or 10 torr or less.

The step 4 is a step wherein polyamide-10 is prepared by the condensation polymerization reaction of 10-aminodecanoic acid while maintaining the pressure reduced to 10 torr or less by the step 3, The condensation polymerization reaction may be conducted for an appropriate time until polyamide-10 intended in the present disclosure is prepared. Preferably, the condensation polymerization reaction time is 10 to 60 minutes.

Further, as the condensation polymerization reaction progresses, polyamide-10 is prepared, and thus, the viscosity of a product increases to generate load in a stirrer, and torque of the stirrer gradually increases. Thus, the degree of progression of condensation polymerization may be judged by the viscosity of a product, and the degree of condensation polymerization may be controlled by torque of a product, and for this purpose, torque of a stirrer may be monitored using a torque meter, and the like, to control the condensation polymerization reaction.

In case it is judged that a condensation polymerization reaction is appropriately progressed, the condensation polymerization reaction may be terminated, and the termination of the condensation polymerization may be enabled by raising the pressure inside of the reactor to a normal pressure.

In order to raise the pressure inside of a reactor to a normal pressure, it is preferable to introduce inert gas in the reactor, and similarly to the step 1, it is preferable to introduce inert gas, particularly nitrogen.

Meanwhile, after the step 4, it is preferable to maintain normal pressure for 5 to 20 minutes. Although a product may be recovered in the step 5 described below immediately after the step 4, the reactor may be maintained for a certain time after the termination of a condensation polymerization reaction so as to stabilize a product, decrease the temperature of a reactor, etc.

The step 5 is a step wherein a product is recovered from the reactor of the step 4, and polyamide-10 strands are obtained from the outlet at the lower part of the reactor, and the final product in the form of a chip may be obtained therefrom using a pelletizer.

Advantageous Effects

As explained above, according to the present disclosure, by preparing polyamide-10 while controlling the condensation polymerization conditions of 10-aminodecanoic acid, polyamide-10 having superior mechanical and thermal properties may be provided.

DETAILED DESCRIPTION OF THE EMBODIMENTS

Hereinafter, preferable examples are presented for better understanding of the invention, but the following examples are presented only as the illustrations of the invention and the scope of the invention is not limited thereby.

Example 1

2.5 kg of 10-aminodecanoic acid (10-ADA) was introduced into a reactor with a capacity of 5 kg. The reactor is equipped with a stirring axis connected to a stirring motor and a helical blade, and has a nitrogen gas inlet, a vacuum vent, and a reaction product outlet.

A process of reducing the pressure inside of the reactor to 200 torr using a vacuum pump, and then, introducing nitrogen to control to a normal pressure was repeated three times, thus removing air existing in the reactor. After finally introducing nitrogen, nitrogen gas was supplied at 1000 cc per minute using a gas flowmeter, and the vent was opened to maintain a nitrogen atmosphere in the reactor.

The temperature of the reactor was raised to 240° C. During the temperature rise process, if a temperature reached 190° C., a stirrer was operated to begin stirring at 10 rpm, and if reached 220° C., stirring at 30 rpm, and if reached 240° C., stirring at 65 rpm, and the stirring speed was maintained.

After 2 hours, a vacuum pump was operated to gradually reduce pressure to 700 torr, 600 torr, 400 torr, 150 torr, 100 torr, 50 torr, and 5 torr or less (total 7 steps). Wherein, each pressure reduction step was conducted at an interval of 5 minutes.

While maintaining 5 torr or less, a reaction was progressed for 1 hour, and torque meter was observed and if reached to 2.5 V, stirring and heating were stopped to terminate polymerization.

Nitrogen was introduced in the reactor and discarded at normal pressure, and after leaving for 10 minutes, outlet in the lower part of the reactor was opened. Polyamide-10 strands discharged through the outlet were passed through a cold water tank, and pellets were obtained with a pelletized, and then, dried to finally obtain polyamide-10.

Example 2

Polyamide-10 was obtained by the same method as Example 1.

Comparative Examples 1 and 2

The following polyamides were used as Comparative Examples 1 and 2.

Comparative Example 1: PA11 (Rilsan, BESNO TL)
Comparative Example 2: PA12 (Rilsan, AESNO TL)

Experimental Example

For the polyamide-10 prepared in Examples 1 and 2, and the polyamide of Comparative Examples 1 and 2, each property was evaluated.

1) Number average molecular weight: A sample was dissolved in hexafluoroisopropanol(HFIP)/0.01 N sodium trifluoroacetate solvent, and number average molecular weight was measured using GPC(Viscotek corporation TDA 305, Refractive index detector), using GPC column (Agilent, PLgel Mixed D).

2) Tensile strength and tensile elongation: measured according to ISO 527-2.

3) Tensile strength and elongation at break: measured according to ISO 527-2.

4) Tensile modulus: measured according to ISO 527-2.

5) Flexural strength and flexural modulus: measured according to ISO 178.

6) Impact strength: measured according to ISO 179.

7) Heat deflection temperature (HDT): measured according to ISO 75.

8) Hardness (Rockwell R): measured according to ISO 2039.

The results evaluated by the above methods were shown in the following Table 1.

TABLE 1

| | Unit | Example 1 | Example 2 | Comparative Example 1 | Comparative Example 2 |
|---|---|---|---|---|---|
| Specific gravity | | 1.03 | 1.03 | 1.02 | 1.01 |
| Melting point | °C. | 186 | 185 | 189 | 177 |
| Number average molecular weight | g/mol | 13,548 | 13,770 | 11,143 | 14,227 |
| Tensile strength | MPa | 54 | 52 | 40 | 45 |
| Tensile elongation | % | 7 | 7 | 8 | 7 |
| Tensile strength at break | MPa | 57 | 53 | 52 | 47 |
| Elongation at break | % | 403 | 312 | 415 | 338 |
| Tensile modulus | MPa | 1,163 | 1,117 | 780 | 959 |
| Flexural strength | MPa | 73 | 69 | 48 | 56 |
| Flexural modulus | MPa | 1,788 | 1,772 | 1,121 | 1,312 |
| Impact strength (Charpy, Notched, 23° C.) | KJ/m$^2$ | 6 | 6 | 6 | 11 |
| Impact strength (Charpy, Notched, −30° C.) | KJ/m$^2$ | 5 | 5 | 6 | 5 |
| HDT (0.45 MPa) | °C. | 110 | 112 | 107 | 103 |
| HDT (1.85 MPa) | °C. | 53 | 54 | 48 | 53 |
| Hardness (Rockwell R) | | 107 | 106 | 98 | 102 |

The invention claimed is:

1. Polyamide-10, wherein
number average molecular weight (g/mol) is 5000 to 25000,
tensile strength (MPa) and tensile modulus (MPa), measured according to ISO 527-2, are 50 to 60, and 800 to 1400, respectively, and
flexural strength (MPa) and flexural modulus (MPa), measured according to ISO 178, are 50 to 90, and 1200 to 1900, respectively.

2. The polyamide-10 according to claim 1,
wherein tensile modulus (MPa) is 1000 to 1200.

3. The polyamide-10 according to claim 1,
wherein the flexural strength (MPa) is 60 to 80.

4. The polyamide-10 according to claim 1,
wherein the flexural modulus (MPa) is 1300 to 1800.

5. The polyamide-10 according to claim 1,
wherein heat deflection temperature measured according to ISO 75 (0.45 MPa condition) is 100° C. or more.

6. The polyamide-10 according to claim 1,
wherein Rockwell hardness measured according to ISO 2039 is 90 or more.

7. A method for preparing the polyamide-10 according to claim 1, comprising steps of:
adding 10-aminodecanoic acid in a reactor (step 1);
raising the temperature of the reactor to 230 to 250° C., and then, maintaining the temperature while stirring 10-aminodecanoic acid (step 2);
reducing the pressure in the reactor to 10 torr or less (step 3);
subjecting the 10-aminodecanoic acid to a condensation polymerization reaction, and then, raising the pressure in the reactor to normal pressure (step 4); and
recovering a product from the reactor (step 5).

8. The method according to claim 7,
wherein in the step 2, after completing the temperature rise, the temperature is maintained for 1 hour to 4 hours.

9. The method according to claim 7,
wherein the step 3 is conducted by sequentially reducing pressure by 50 to 200 torr in plural stages, to reduce pressure to 10 torr or less.

10. The method according to claim 9,
wherein the plural stages include 2 to 10 stages.

11. The method according to claim 9,
wherein each of the pressure reduction stages is sequentially progressed at an interval of 2 to 10 minutes.

12. The method according to claim 7,
wherein the condensation polymerization reaction of step 4 is conducted for 10 to 60 minutes.

13. The method according to claim 7,
wherein after the step 4, normal pressure is maintained for 5 to 20 minutes.

* * * * *